US005452603A

United States Patent [19]

Asano et al.

[11] Patent Number: 5,452,603

[45] Date of Patent: Sep. 26, 1995

[54] METHOD FOR DETECTING LEAN LIMIT BY MEANS OF IONIC CURRENT IN AN INTERNAL COMBUSTION ENGINE

[75] Inventors: Morito Asano; Katsuyuki Kajitani; Sadao Takaki; Manabu Takeuchi, all of Osaka, Japan

[73] Assignees: Daihatsu Motor Co., Ltd.; Diamond Electric Mfg. Co., Ltd., both of Osaka, Japan

[21] Appl. No.: 91,051

[22] Filed: Jul. 14, 1993

[30] Foreign Application Priority Data

Jul. 21, 1992 [JP] Japan .................................... 4-193584

[51] Int. Cl.$^6$ .................................................. G01M 15/00

[52] U.S. Cl. ............................................................. 73/116

[58] Field of Search .................................. 73/116, 23.31, 73/23.32; 324/393, 399, 693; 123/672, 673, 704

[56] References Cited

U.S. PATENT DOCUMENTS

| | | | |
|---|---|---|---|
| 4,125,374 | 11/1978 | Bode et al. | 73/23.22 |
| 4,574,627 | 3/1986 | Sakurai et al. | 73/23.32 |
| 5,180,984 | 1/1993 | Murata et al. | 324/399 |
| 5,271,268 | 12/1993 | Ikeuchi et al. | 324/393 |

FOREIGN PATENT DOCUMENTS

| | | | |
|---|---|---|---|
| 3827040 | 2/1990 | Germany | 123/672 |
| 62-162742 | 7/1987 | Japan . | |

*Primary Examiner*—Robert Raevis

*Attorney, Agent, or Firm*—Banner, Birch, McKie & Beckett

[57] ABSTRACT

An object of the invention is to detect an upper limit of a lean burn zone in an internal combustion engine in each ignition. The lean limit is detected on the basis of the characteristics of the ionic current in a cylinder of the engine immediately after ignition.

14 Claims, 10 Drawing Sheets

*Table 1*

| | | | | | | | | | | | | |
|---|---|---|---|---|---|---|---|---|---|---|---|---|
| crank angle BTDC | 10° CA | 7.5 | 5 | 2.5 | 0 | | | | | | | |
| Kθ | -1.91 | -1.37 | -0.82 | -0.27 | 0.00 | | | | | | | |
| crank angle ATDC | 0° CA | 2.5 | 5 | 7.5 | 10 | 12.5 | 15 | 17.5 | 20 | 22.5 | 25 | 27.5 |
| Kθ | 0.00 | 0.27 | 0.82 | 1.37 | 1.91 | 2.45 | 2.98 | 3.49 | 4.00 | 4.50 | 4.98 | 5.44 |
| crank angle ATDC | 30 | 32.5 | 35 | 37.5 | 40 | 42.5 | 45 | 47.5 | 50 | 52.5 | 55 | 57.5 |
| Kθ | 5.89 | 6.32 | 6.73 | 7.12 | 7.49 | 7.48 | 8.16 | 8.45 | 8.73 | 8.97 | 9.19 | 9.39 |
| crank angle ATDC | 60 | 62.5 | 65 | 67.5 | 70 | 72.5 | 75 | 77.5 | 80 | 82.5 | 85 | 87.5 |
| Kθ | 9.55 | 9.69 | 9.81 | 9.89 | 9.95 | 9.99 | 10.00 | 9.99 | 9.95 | 9.89 | 9.80 | 9.70 |

METHOD FOR DETECTING LEAN LIMIT BY MEANS OF IONIC CURRENT IN AN INTERNAL COMBUSTION ENGINE

BACKGROUND OF THE INVENTION

The present invention relates to a method for detecting a lean limit by means of ionic current in an internal combustion engine mainly of an automobile driven in a lean burn zone in which the air-fuel ratio is high.

In recent years the necessity has been realized of driving an automobile with the air-fuel ratio of the mixture gas set at the lean side of the stoichiometric air-fuel ratio in order to improve fuel consumption. In internal combustion engines, an air-fuel ratio control device, such as described in Japanese Pat. Laid-open No. 62-162742, is well known. The air-fuel ratio control device first detects an engine load. If the engine is in a predetermined transient state, feedback control is conducted in accordance with the stoichiometric air-fuel ratio. If the engine is in a normal state, the amount of fuel supply is controlled in accordance with the air-fuel ratio set at the lean side of the stoichiometric air-fuel ratio. At the upstream side of a three-way catalyst converter in the exhaust system of the engine there is provided an air-fuel ratio sensor. The air-fuel ratio set at the lean side of the stoichiometric air-fuel ratio is controlled so as to approach a target air-fuel ratio in accordance with the output from the air-fuel ratio sensor.

It is known that torque fluctuation occurs in an engine as the air-fuel ratio is increased (see FIG. 10). In order to avoid torque fluctuation, the air-fuel ratio should be set below a certain value in the lean burn zone. Torque characteristics, as shown in FIG. 11, are peculiar to an engine or the environment in which the engine is driven, and the upper limit of the air-fuel ratio in the lean burn zone fluctuates with the driving environment or the engine. Accordingly, the upper limit of the air-fuel ratio in the lean burn zone should be adjusted for each engine or a particular driving environment, and the target air-fuel ratio is set with a certain safety factor taken into consideration.

The air-fuel ratio set with the safety factor as mentioned above poses a problem that fuel consumption is aggravated or $NO_x$ is increased. This problem may be solved by detecting the limit of torque fluctuation, and then delimiting the lean burn zone with a target air-fuel ratio set at a value lower than the air-fuel ratio at which the torque fluctuates. However, there is no effective way of detecting torque fluctuation, with resulting difficulty in controlling the engine near the upper limit of the lean burn zone.

The present invention is intended to solve these problems.

SUMMARY OF THE INVENTION

In accordance with the invention, the object is attained in the following manner. The method for detecting a lean limit by means of ionic current is characterized by the steps of; measuring a characteristic of the ionic current flowing in a cylinder of the engine immediately after ignition, and detecting the lean limit on the basis of the characteristic of the ionic current.

In accordance with the invention, the following characteristics of the ionic current may be used.

(1) Total duration time period for which the ionic current is above a predetermined reference level.

(2) Time period from ignition to the final point when the ionic current is above the predetermined reference level.

(3) Dispersion of peak values of the ionic current.

(4) Dispersion of integral values of the ionic current in the time period from ignition to the above-mentioned final point.

(5) Dispersion of the products of peak values of the ionic current multiplied by the combustion time period.

(6) Dispersion of the products of ionic current values measured at predetermined intervals multiplied by a coefficient weighted by the nominal cylinder volume.

The lean limit is detected on the basis of at least one of the above-mentioned factors or characteristics (1) and (2). It can also be detected on the basis of the dispersion (3), (4), (5), or (6), or combinations of the dispersions (1) and (3), (1) and (4), (2) and (3), or (2) and (4). The above-mentioned dispersion can be determined on the basis of a mean value or a variance of the respective values, or a quotient of a standard deviation divided by the mean value, or a quotient of the variance divided by the mean value. The mean value, the standard deviation, and the variance can be calculated by a well-known method in statistics.

The lean limit can also be detected in the following manner: A characteristic of the ionic current flowing in a cylinder of an engine is measured immediately after ignition, and a comparison is made between the characteristic of the ionic current and a predetermined reference characteristic, and the lean limit is detected when the characteristic of the ionic current deviates from the predetermined reference characteristic. In this case, the characteristic of the ionic current is preferably the total duration time period for which the ionic current is above the predetermined reference level, or the time period from ignition to the final point when the ionic current is above the predetermined reference level.

The lean limit can also be detected in the following manner: A characteristic value of the ionic current flowing in a cylinder of an engine is measured after ignition at predetermined intervals from a predetermined time prior to the top dead center, and the mean value of the measured characteristic values, or the variance thereof, or the quotient of the variance divided by the mean value is calculated, so that the lean limit is detected on the basis of the above-mentioned calculated values. In this case, the characteristic value of the ionic current can be the peak value of the ionic current, or the product of the peak value of the ionic current multiplied by the combustion time period, or the total of the products, each of which is obtained by multiplying one of the ionic current values measured at predetermined intervals by a predetermined coefficient, which is preferably an effective work coefficient, which varies with the nominal cylinder volume.

With the above-mentioned arrangement, the lean limit is detected on the basis of the characteristics of the ionic current. In particular, if the air-fuel ratio is higher than the upper limit of the lean burn zone, combustion is likely to be slow, so that the time period for which the ionic current is above a predetermined reference level becomes longer, or the peak value of the ionic current becomes lower, than in normal combustion. Therefore, the lean limit can be detected by measuring the above-mentioned time period for which the ionic current is above the predetermined reference level and which increases with the combustion time period, or the dispersion of the peak values of the ionic current. This makes it possible to easily control the air-fuel ratio in the lean burn zone since the lean limit can be detected at each ignition, or in each cylinder in the case of an engine having a plurality of cylinders.

BRIEF DESCRIPTION OF THE DRAWINGS

The objects and features of the invention may be understood with reference to the following detailed description of illustrative embodiments of the invention, taken together with the accompanying drawings in which.

DETAILED DESCRIPTION OF THE PREFERRED EMBODIMENTS

An embodiment of the invention will now be described with reference to FIGS. 1 through 7.

Figure 1:
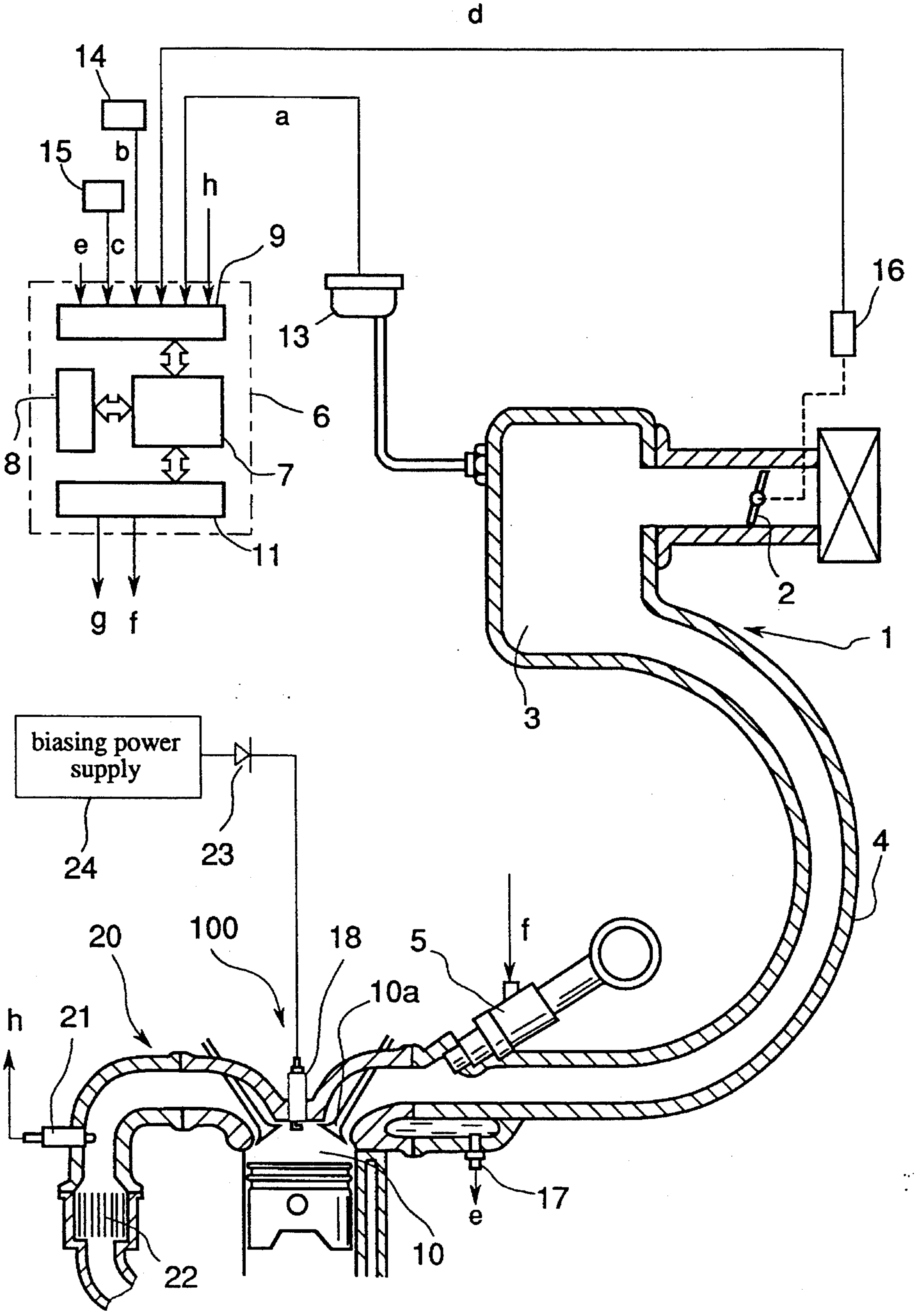
FIG. 1 is a schematic view of an engine in a first embodiment of the invention.

FIG. 1 schematically shows a part of an automobile engine 100 having four cylinders, in whose intake system 1 there is provided a throttle valve 2 which opens and closes as an accelerator pedal (not shown) is operated. A surge tank 3 is provided downstream of the throttle valve 2. An intake manifold 4 in the intake system 1 is connected through the surge tank 3. A fuel injection valve 5 is provided near that end of the intake manifold 4 which is connected to a cylinder 10 through an intake valve 10*a*. The fuel injection valve 5 is so designed as to be controlled by an electronic control device 6 to inject fuel into each of the cylinders independently of the others. Provided in an exhaust system 20 is a conventional lean sensor 21, i.e. an air-fuel ratio sensor, for measuring the concentration of oxygen in exhaust gas upstream of a three-way catalyst converter 22 provided in an exhaust gas passage extending to a muffler (not shown). With a predetermined voltage impressed across the electrodes of the lean sensor provided at the atmosphere side and the exhaust side, the sensor outputs a current in accordance with the concentration of oxygen in the exhaust gas as the air-fuel ratio changes from the stoichiometric air-fuel ratio while feedback control is conducted through the lean burn zone.

The electronic control device 6 is provided with an A/D converter and comprises a micro-computer including a central processing unit 7, a memory 8, an input interface 9, and an output interface 11. The following signals are input to the input interface 9: an intake pressure signal a output by an intake pressure sensor 13 for detecting the pressure in the surge tank 3; a signal of the engine speed b output by an engine speed sensor 14 for detecting the engine speed NE; a vehicle speed signal c output by a vehicle speed sensor 15 for detecting the vehicle speed; an LL signal d output by an idle switch 16 for detecting whether the throttle valve 2 is open or not; a coolant temperature signal e output by a coolant temperature sensor 17 for detecting the engine coolant temperature; and a current signal h output by the above-mentioned lean sensor 21. On the other hand, the following signals are output by the output interface 11: a fuel injection signal f input to the fuel injection valve 5; and an ignition pulse g input to a spark plug 18. A biasing power supply 24 is connected to the spark plug 18 for measuring the ionic current through a high-voltage diode 23. Any known circuit including the biasing source for measuring the ionic current and any known method of measuring the current, such as described in MOTOR TECHNISCH ZEITSCHRIFT 51 Jahrgang/Nr. 3 März 1990 pp. 118–122, can be used in this invention.

The electronic control device 6 receives the intake pressure signal a output by the intake pressure sensor 13 and the engine speed signal b output by the engine speed sensor 14 and corrects the basic fuel injection time period with various correction coefficients determined in accordance with the engine conditions, thereby to determine a time period for which the fuel injection valve 5 opens, i.e. an actuation time period T for which the injector is actuated. The electronic control device 6 then controls the fuel injection valve 5 to inject fuel to the intake system 1 through the fuel injection valve 5 in accordance with the actuation time period T determined in the above manner, thereby to supply a proper amount of fuel to the engine in accordance with the engine load. A program for effecting the above steps is contained in the control device 6. In accordance with the program, the ionic current in a cylinder immediately after ignition is compared with a predetermined reference level, and the time period for which the ionic current is above the predetermined reference level is measured, so that the lean limit is detected when the measured time period is above a predetermined value.

Figure 2:
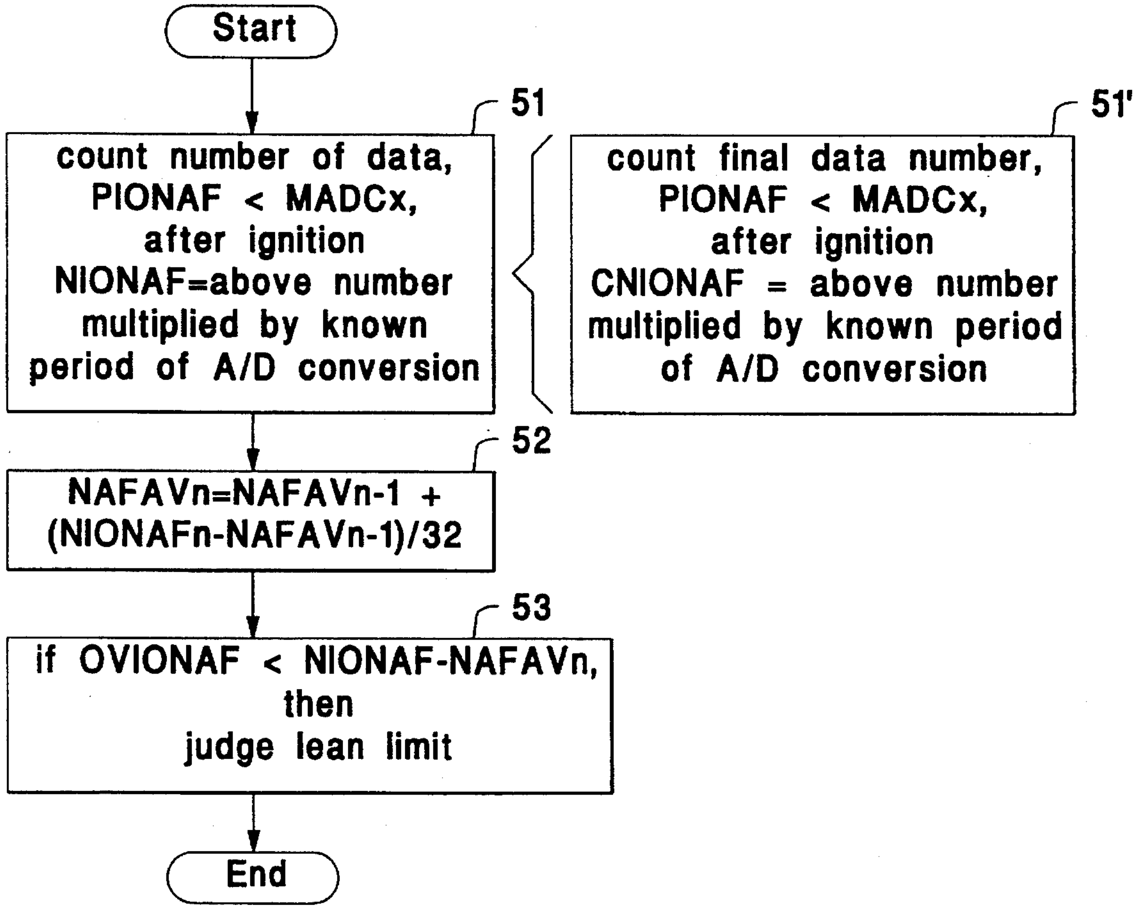
FIG. 2 is a flow chart showing the steps of Control in the first embodiment of the invention.

The program for detecting the lean limit is schematically shown in FIG. 2, wherein the program to calculate the effective fuel injection time period TAU with various correction coefficients taken into consideration and to calculate the actuation time period T for actuating the injector is not illustrated, because any conventional program can be used for the purpose. Selection between the feedback control for running the engine near the stoichiometric air-fuel ratio and the control in the lean burn zone is made on the basis of the engine speed, the engine load, the coolant temperature, etc. Except when the engine is started, or being warmed up with an increased supply of fuel, or in a transient state such as while it is being accelerated, the engine is controlled in the lean burn zone while it is driven in a normal steady state.

Figure 3:
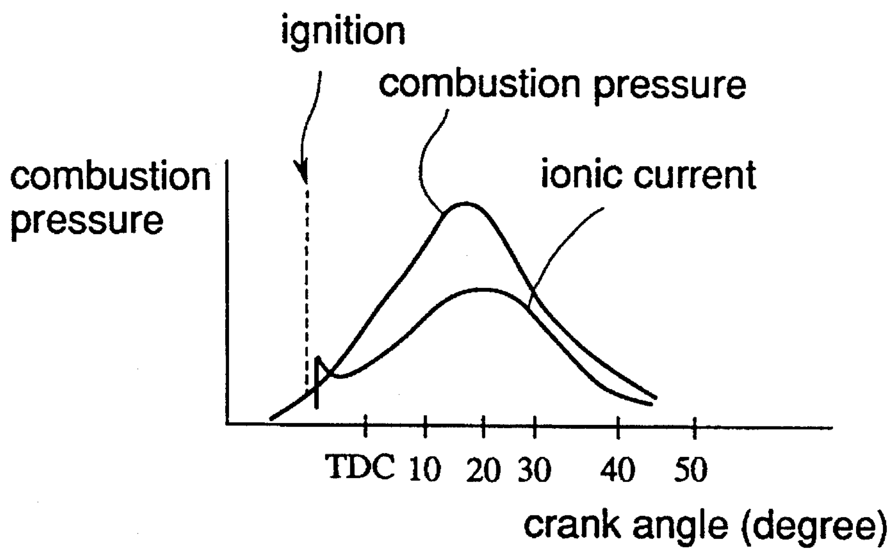
FIG. 3 is a graph showing a relation of a combustion pressure and an ionic current changing with the crank angle in the first embodiment of the invention.
Figure 4:
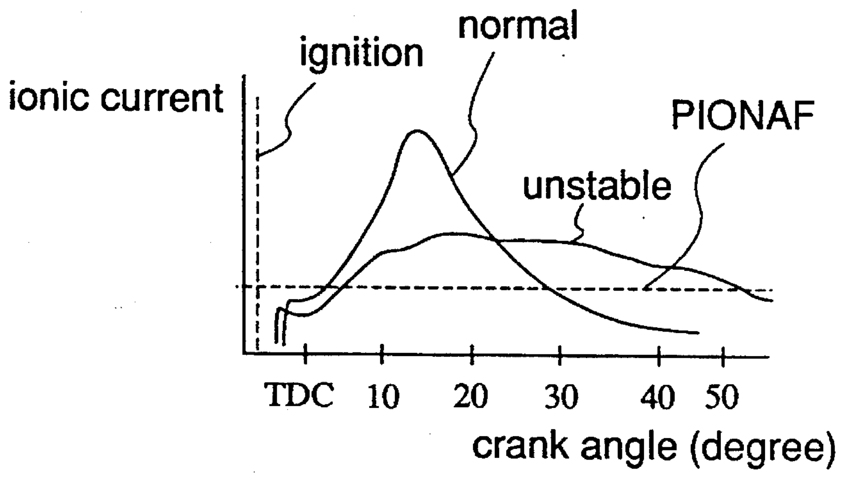
FIG. 4 is a graph showing a relation of an ionic current and the crank angle in case combustion is both stable and unstable in the first embodiment of the invention.

The lean limit is detected by means of ionic current in the following manner. When a bias voltage is impressed on the spark plug 18 by the biasing power supply 24 immediately after ignition, in the case of normal combustion, an ionic current first flows abruptly, and decreases, and then increases again until it reaches a peak value adjacent to a crank angle at which the combustion pressure is the greatest. Although ionic current flowing changes according to the ignition timing, for example, as shown in FIG. 3, an ionic current first flows abruptly, and decreases until a point a little before the top dead center TDC is reached, and then increases again until it reaches a peak value adjacent to a crank angle at which the combustion pressure is the greatest. In the case of unstable combustion, as shown in FIG. 4, the ionic current remains relatively low without an appreciable peak value because the latter half of the combustion is less active than the normal combustion. The ionic current having the above-mentioned characteristics is measured at predetermined intervals, and the lean limit is detected on the basis of the duration time period for which the ionic current remains above a predetermined reference level PIONAF for detecting the state of combustion.

Figure 5:
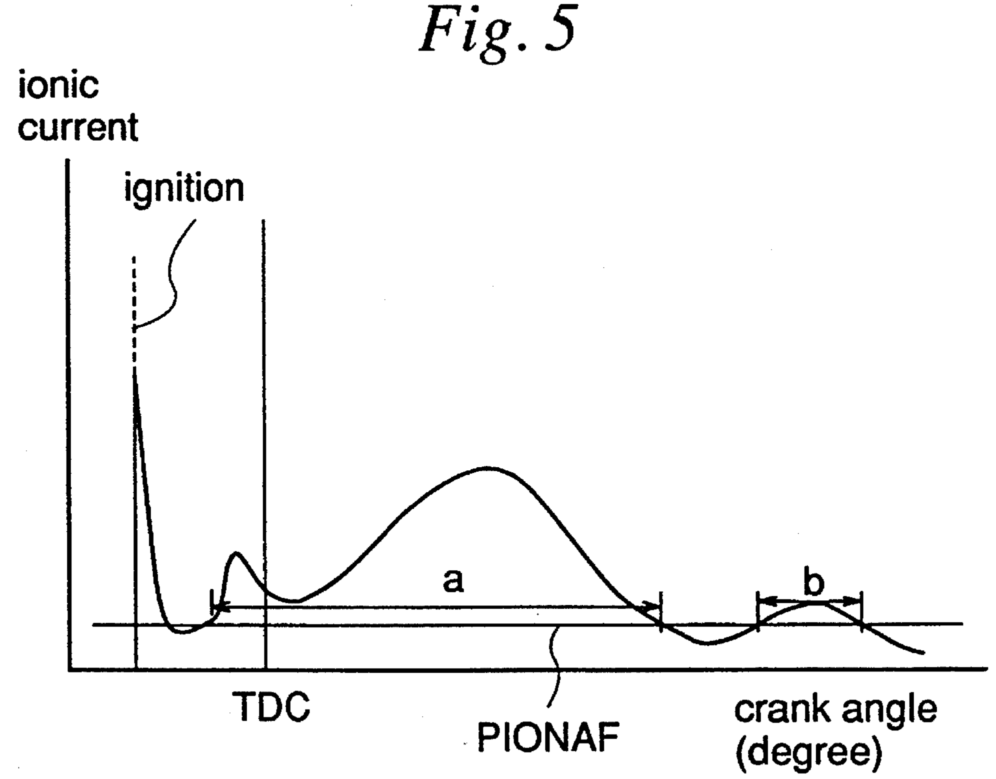
FIG. 5 shows a combustion time period at step 51 in the first embodiment of the invention.

A process for detecting the lean limit will now be described with reference to FIG. 2. At step 51, of the values or data of the ionic current MADCx measured at predetermined intervals after ignition, the number of those data which are above the predetermined reference level PIONAF is counted. As shown in FIG. 5, if the time period for which the ionic current MADCx is above the predetermined reference level PIONAF consists of the first and second time periods a and b, the total number of the A/D converted data or ionic current values in both time periods a and b are calculated. The A/D conversion of the ionic current MADCx is started at ignition and is performed for a period set in accordance with the engine speed. The converted values of the ionic current MADCx are stored in a RAM of the memory 8. The A/D conversion is performed only within a time period from ignition to a predetermined crank angle, for example, 80° CA, and is not performed after that. A combustion time period NIONAF is then calculated from the calculated number of the data. The combustion time period NIONAF is a product of the above-mentioned calculated total number of the data multiplied by the known period of the A/D conversion, for example, 2.5° CA.

At step 52 the calculated combustion time period NIONAF is smoothed in accordance with the following expression (1) to obtain a smoothed combustion NAFAVn.

$$NAFAVn=NAFAVn-1+(NIONAFn-NAFAVn-1)/32 \quad (1)$$

At step 53, if a value obtained by subtracting the combustion time period NAFAVn smoothed in accordance with the expression (1) from the current combustion time period NIONAFn is above a predetermined reference level OVIONAF of the combustion time period for detecting the lean limit, the state is judged to be the lean limit.

With this arrangement, the lean limit can be detected each ignition and in each cylinder.

Figure 6:
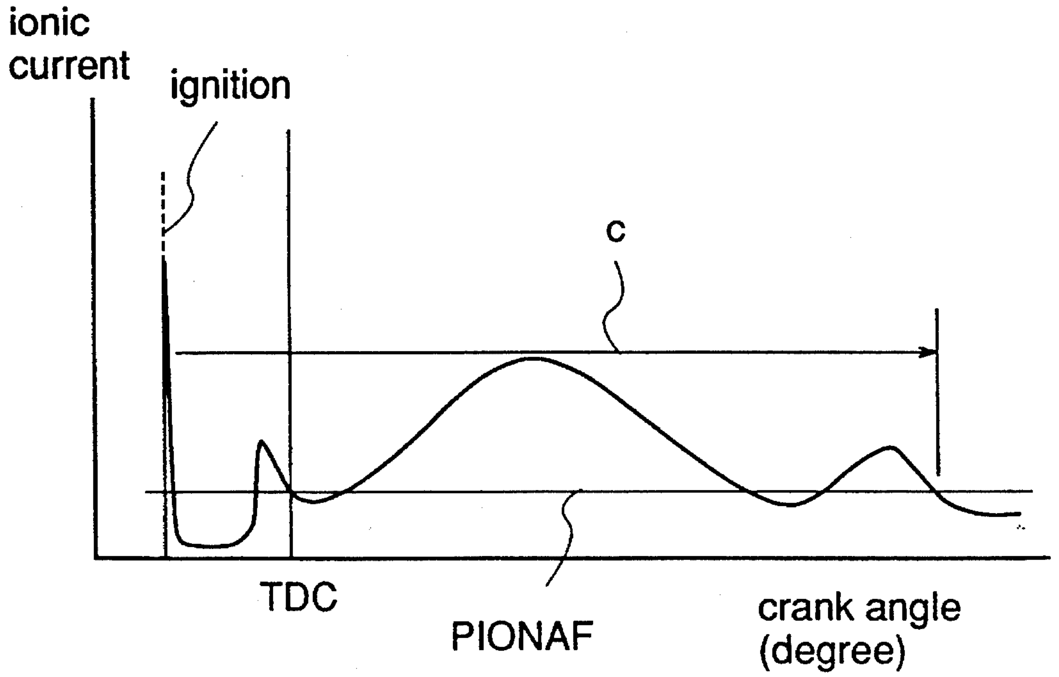
FIG. 6 shows a combustion time period at step 51' in the first embodiment of the invention.

At the above-mentioned step 51, the combustion time period NIONAF, for which the ionic current MADCx remains above the predetermined reference level PIONAF, is measured. Alternatively, at step 51', a combustion time period CNIONAF is measured as illustrated in FIG. 6 by measuring a time period c from ignition to a final point at which the ionic current MADCx remains above the predetermined reference level PIONAF. In this case the time period in which the ionic current MADCx is A/D converted is also restricted by a crank angle, for example, 80° CA, within which the latest point at which the ionic current MADCx is above the predetermined reference level PIONAF is adopted as the above-mentioned final point.

Two other embodiments of the invention will now be described with reference to FIG. 7 and FIG. 8.

Figure 7:
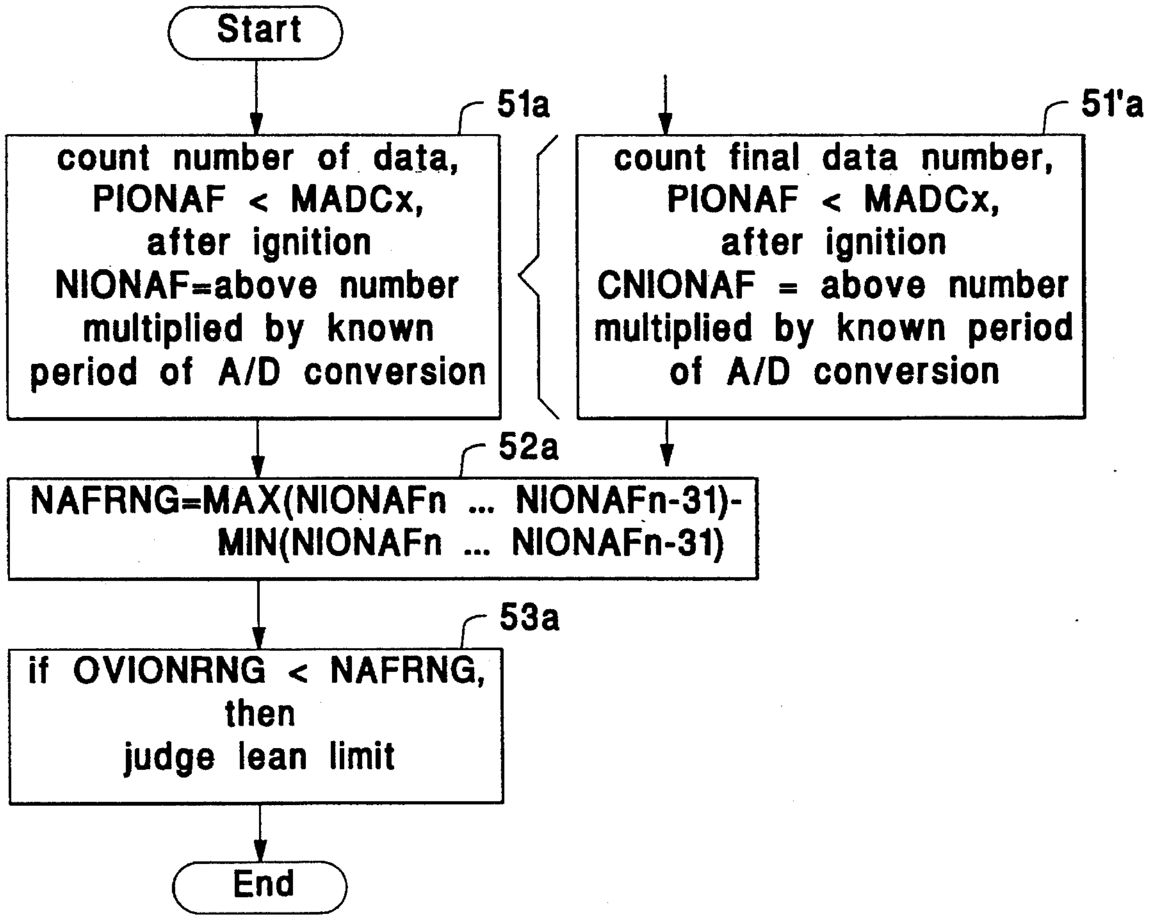
FIG. 7 is a flow chart showing the steps of control in a second embodiment of the invention.

FIG. 7 shows a flow chart of a second embodiment of the invention. Step **51*a* is a step for calculating the combustion time period NIONAF just as in the first embodiment. Step 51*a*' can be substituted for step 51*a*. Next at step 52*a* the maximum and the minimum values of the combustion time period NIONAF are selected from all of the combustion time periods NIONAF, including the current combustion time period NIONAFn, measured in a plurality, say, 32 ignitions, preceding the current one, and the difference between the maximum and the minimum values is calculated to obtain a combustion fluctuation time NAFRNG. At step 53*a***, if the combustion fluctuation time NAFRNG obtained in the above manner is above a predetermined reference level OVIONRN of the combustion fluctuation time, the combustion is judged to be at the lean limit. In particular, the reason why the combustion fluctuation time NAFRNG is above the predetermined reference level OVIONRNG is because the current combustion is so slow that the current combustion time period NIONAFn becomes longer than the preceding combustion time period NIONAF because of slow combustion, with resulting increase of the combustion fluctuation time NAFRNG.

Figure 8:
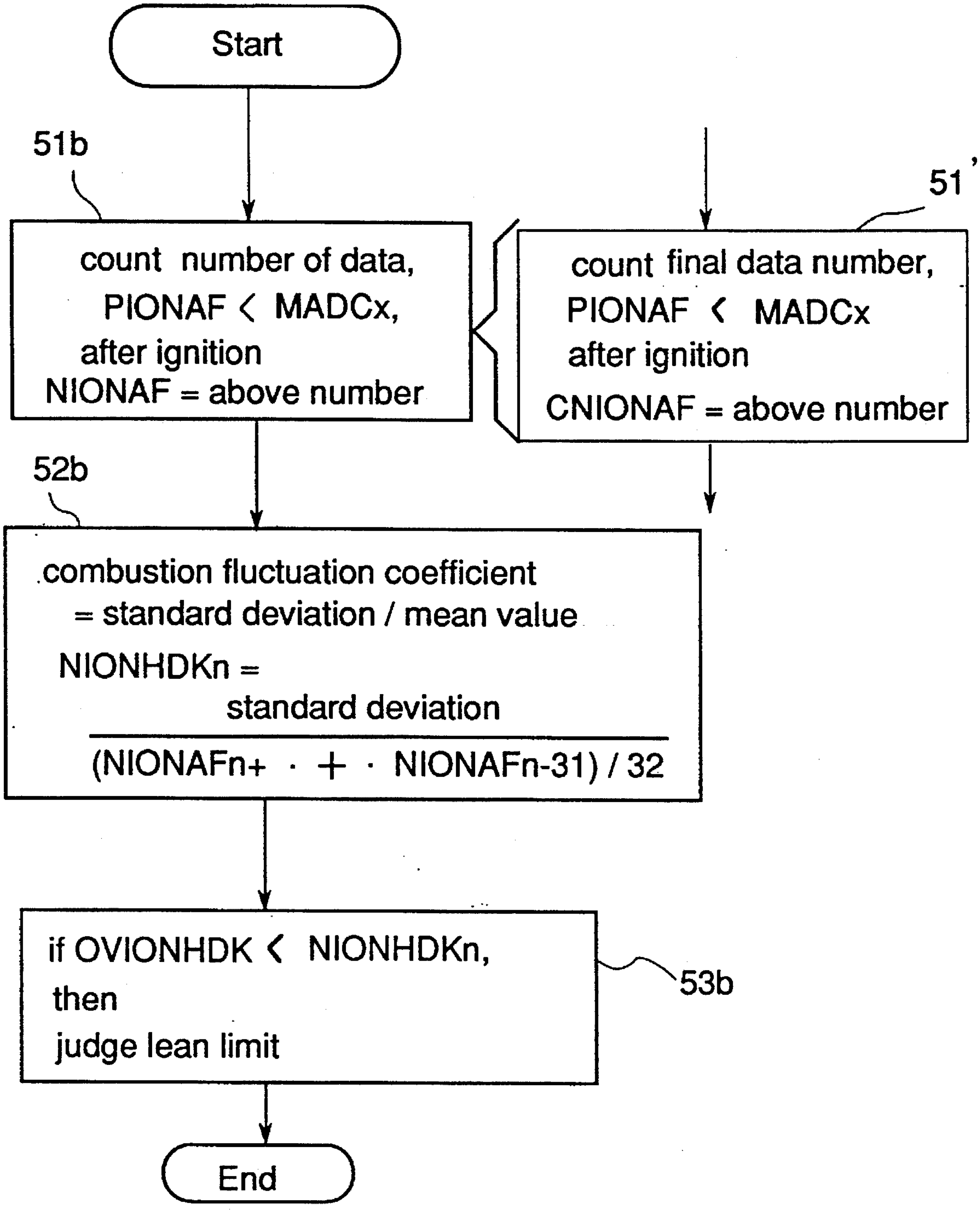
FIG. 8 is a flow chart showing the steps of control in a third embodiment of the invention.

FIG. 8 shows a third embodiment of the invention, where the combustion time period NIONAF is calculated at step **51*b* in the same way as in the above-mentioned two preferred embodiments. At step 52*b*, the combustion fluctuation coefficient NIONHDK is calculated by dividing the standard deviation of the current combustion time period NIONAF and the previous combustion time periods NIONAF measured in a plurality, say, 32 ignitions preceding the current one by the mean value thereof. A well-known method can be used to calculate the standard deviation. Next, at step 53*b*** if the combustion fluctuation coefficient NIONHDKn is above a predetermined reference level OVIONHDK of the combustion fluctuation coefficient, which is set for detecting the lean limit, the current combustion is judged to be at the lean limit. In short, the condition that the combustion fluctuation coefficient NIONHDKn is above the predetermined reference level OVIONHDK is caused by fluctuation of the combustion time period NIONAF due to slow combustion or misfiring. The standard deviation can be replaced by the variance in statistics.

In the above embodiment, the lean limit is detected by the quotient of the standard deviation of the combustion time periods NIONAF divided by the mean value thereof. The standard deviation and the mean value of the combustion time periods NIONAF can be replaced by the variance and the mean value of peak values of the ionic current MADCx. The peak values of the ionic current MADCx vary with the condition of combustion. Therefore, the lean limit can be detected by the dispersion of the peak values of the ionic current MADCx.

In an embodiment in which the mean value of peak values of the ionic current MADCx is used, the lean limit is detected by making a comparison between the mean value of the peak values and a predetermined reference level to detect the lean limit in case the mean value is below the reference level. In the embodiment in which the variance or the quotient of the variance divided by the mean value is used, the lean limit is detected by making a comparison between the variance or the above-mentioned quotient and the predetermined reference level. The mean value and the variance can be calculated by a well-known method from the peak values sampled in, for example, 32 ignitions in the same way as in the above-mentioned embodiments. The peak value of the ionic current MADCx is selected from all of the ionic currents MADCx sampled in a range from 10° CA prior to the top dead center. This makes it possible to eliminate the ionic current MADCx of such a level as can be considered as noise, thereby to sample a peak value of the ionic current MADCx after a steady ionic current MADCx begins to flow. The starting point of the sampling is not always at 10° CA prior to the top dead center, but can be at any time after the ionic current MADCx has been stabilized.

Instead of the peak value of the ionic current MADCx, the product of the peak value at each ignition multiplied by the combustion time period can also be used. In particular, the lean limit can be detected on the basis of the mean value of the above products obtained in 32 ignitions, the variance thereof, or the quotient of the variance divided by the mean value. In this case the combustion time period is from ignition to the time at which the ionic current MADCx lowers below the predetermined reference level. It can be either the combustion time period NIONAF or CNIONAF described in the above embodiments. The predetermined reference level may be, for example, 1/125 of 5 V which is the maximum output from the A/D converter. This value can be used as the reference value in the above-mentioned embodiments.

Figure 12:
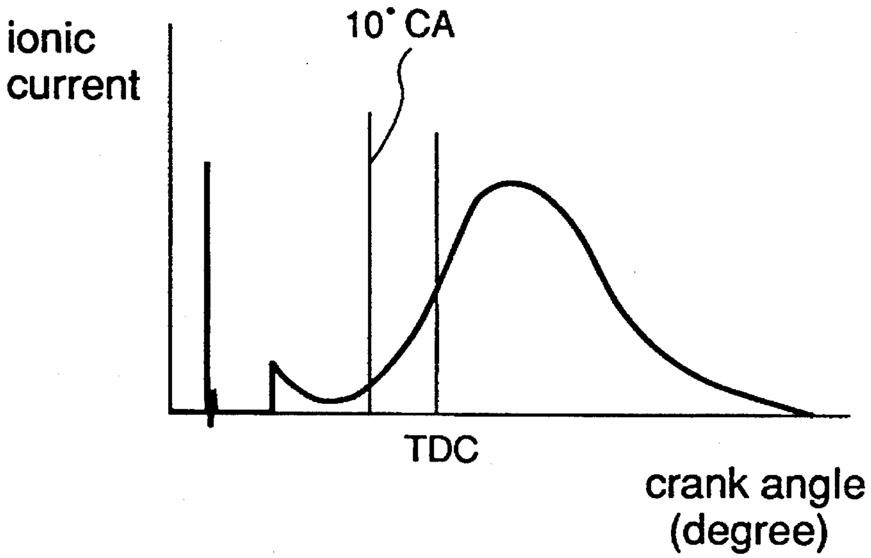
FIG. 12 is a graph showing a wave form of an ionic current in a modification of the second embodiment of the invention.

The lean limit can also be detected by means of the mean value or the variance of totals obtained, for example, in 32 ignitions, each of totals being a sum of the products of the output values of the ionic current MADCx multiplied by a predetermined effective work coefficient K. The output values of the ionic current MADCx are sampled at every 2.5° CA in a range from 10° CA prior to the top dead center TDC, as shown in FIG. 12. The effective work coefficient K is set in accordance with the nominal cylinder volume. The effective work coefficient $K_\theta$ sampled at every 2.5° CA is calculated by the expressions (2) to (5), $$K_\theta = 10 \times (\Delta V/\Delta V\text{max}) \quad (2)$$

$$\Delta V = Vn - Vn - 1 \quad (3)$$

$$V = \pi/4 \times D^2 \times x_\theta + V\text{clear} \quad (4)$$

$$x_\theta = (r+L) - \{r\cos\theta + L \times \sqrt{1-(r\sin\theta/L)^2}\;\} \quad (5)$$

where Vclear is the volume of a combustion chamber, r is the distance between the centers of a crank pin and a crank journal, L is the length of a connecting rod, D is the bore, that is the diameter of a cylinder, V is the nominal cylinder volume including the volume of the combustion chamber, and ΔV is the amount of change of the nominal cylinder volume.

Figure 13:
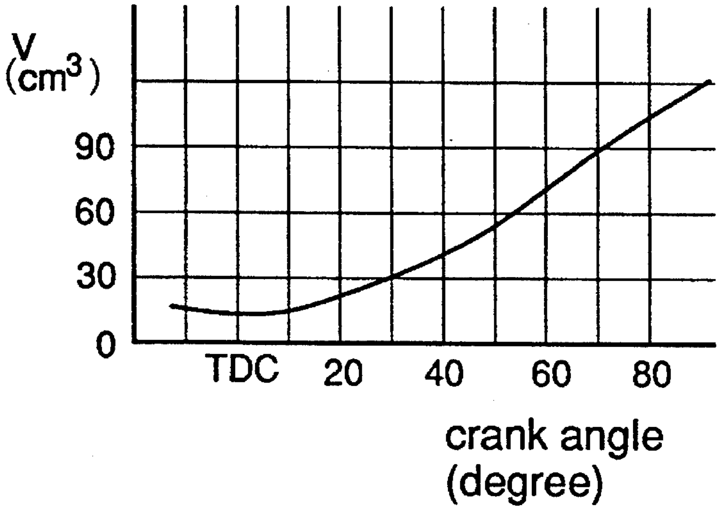
FIG. 13 is a graph showing a relation of the crank angle and the nominal cylinder volume in the modification of the second embodiment of the invention.
Figures 14, 15:
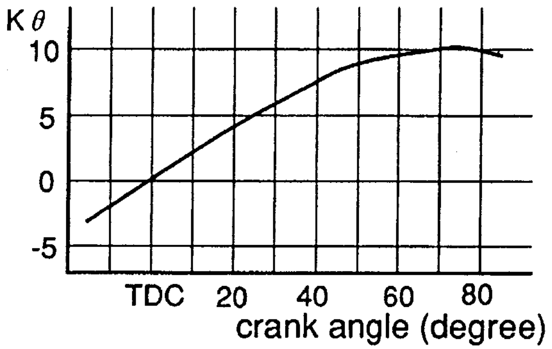
FIG. 14 is a graph showing values of the effective work coefficient in the modification of the second embodiment of the invention.
FIG. 15 is a table showing values of the effective work coefficient in the modification of the second embodiment of the invention.

As shown in table 1 of FIG. 15, the coefficient $K_\theta$ is set with the value thereof at a crank angle of 75° after the top dead center being set to the greatest value of 10.00. In the case of a cylinder in which the bore is 62 mm, the length of the connecting rod is 120 mm, the length between the centers of the crank pin and the crank journal is 30 mm, and the volume of the combustion chamber is 18.00 $cm^3$, the nominal cylinder volume, as shown in FIG. 13, reaches minimum value at the top dead center and then increases monotonously. Using the effective work coefficient $K_\theta$, which changes with the crank angle as shown in FIGS. 14 and 15, the lean limit is detected by the steps of; multiplying the ionic current MADCx measured at every 2.5° CA in one ignition by the effective work coefficient $K_\theta$ which corresponds to the current value, summing up the results of the multiplication, for example, in 32 ignitions, calculating the mean value of the total obtained by summing up, and detecting the lean limit when the above mean value is above a predetermined reference value. The mean value is of all the output values sampled in a range from the crank angle of 10° CA prior to the top dead center. The output values sampled after the top dead center, the products of which multiplied by the effective work coefficient $K_\theta$ are positive including zero, may also be used. The mean value can be replaced by the variance of the totals of products of the output values multiplied by the effective work coefficient $K_\theta$ or the quotient of the variance divided by the mean value. The lean limit can be detected by comparing the above variance or the above quotient with a predetermined reference value.

By correcting the amount of fuel to be injected on the basis of the lean limit detected by means of the above-mentioned methods, it is possible to continue driving under a good condition with the air-fuel ratio set within the lean burn zone.

Figure 9:
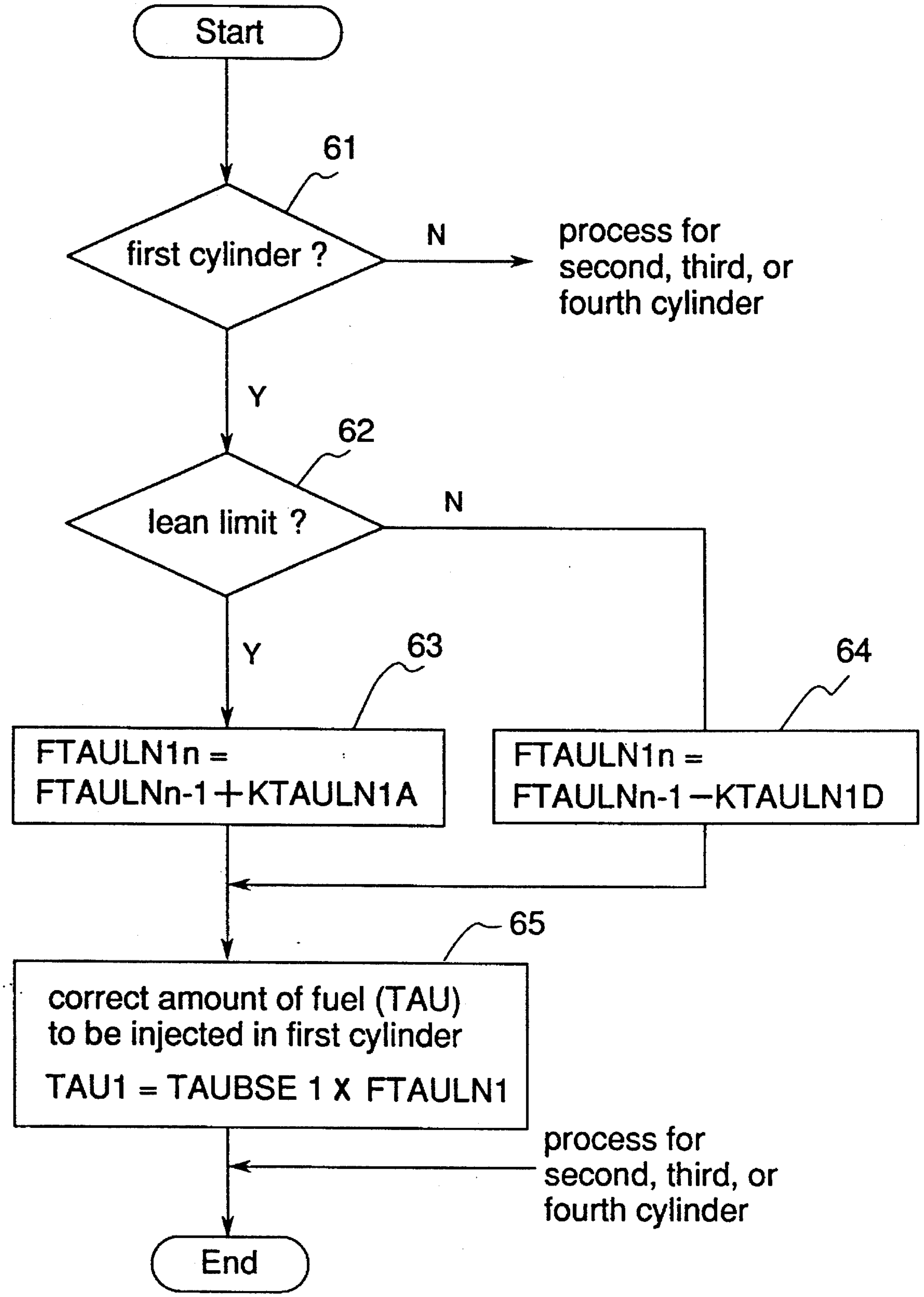
FIG. 9 is a flow chart showing the steps of controlling the amount of fuel to be injected by detecting a lean limit in the third embodiment of the invention.
Figure 10:
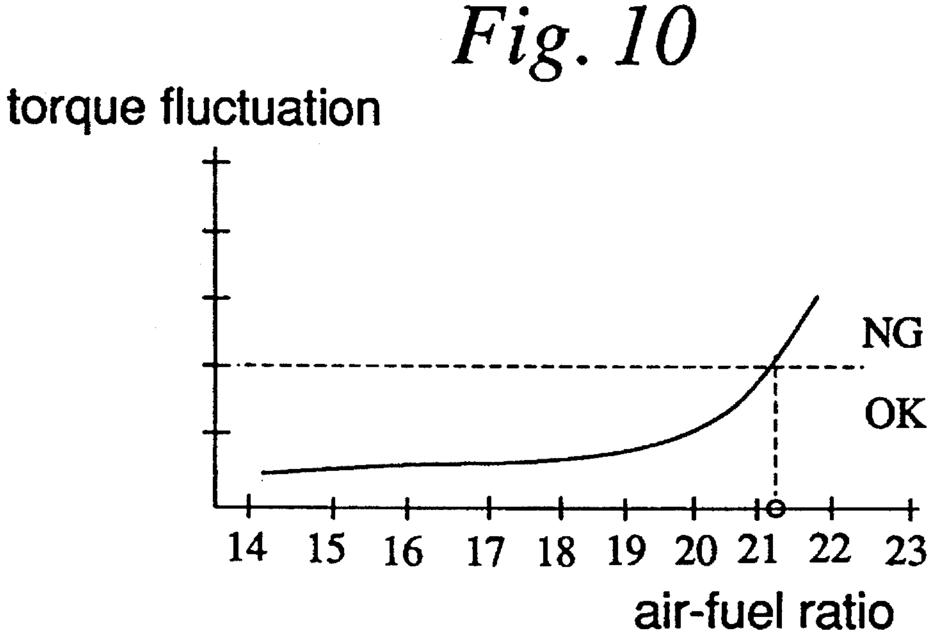
FIG. 10 is a graph showing a relation of torque fluctuation and an air-fuel ratio.
Figure 11:
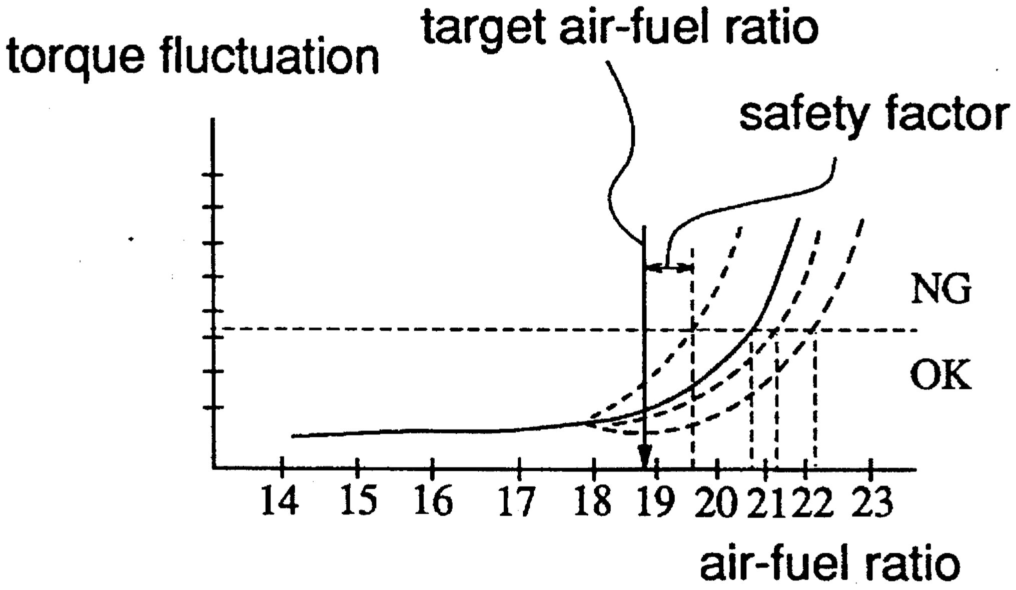
FIG. 11 is a graph showing dispersion of limits of the lean burn zone in a conventional system.

The process of increasing the amount of fuel to be injected with the lean limit having been detected will now be described with reference to a flow chart shown in the FIG. 9. First, at step 61, it is determined whether or not the cylinder under examination is the first cylinder by a cylinder discriminating signal which is output by a cam position sensor, not shown. If it is found that the cylinder under examination is the first cylinder, the control operation proceeds to step 62. If it is not the first cylinder, the process for the second, the third, or the fourth is followed. For these cylinders, no explanation will be given because the process is the same as that of the above-mentioned first cylinder. Then at step 62, it is determined whether or not the lean limit is detected. If it is found that the lean limit has been reached, the control proceeds to step 63. Otherwise, the control proceeds to step 64. At step 63, a correction coefficient FTAULN1 for fuel injection is calculated by the following expression (6), in which the current correction coefficient FTAULN1n for fuel injection is calculated by adding an amount KTAULN1A to be added for correction at the lean limit to the previous correction coefficient FTAULNn−1.

$$\text{FTAULN1n=FTAULNn−1+KTAULN1A} \quad (6)$$

At step 64, a correction coefficient FTAULN1 for fuel injection is calculated by the following expression (7), in which the current correction coefficient FTAULN1n for fuel injection is obtained by subtracting from the previous correction coefficient FTAULNn−1 for fuel injection an amount KTAULN1D to be subtracted for correction until the upper limit of the air-fuel ratio is reached in the lean burn zone.

$$\text{FTAULN1n=FTAULNn−1−KTAULN1D} \quad (7)$$

At step 65, an effective fuel injection time period TAU1 for the first cylinder is calculated in accordance with the following expression (8), in which FAULN1 is a calculated correction coefficient for fuel injection, and TAUBSE1 is a parameter obtained by multiplying the basic fuel injection time period TP by various correction coefficients required at the time of calculation.

TAU1=TAUBSE1×FAULN1 (8)

With the above arrangement, while the engine is being run in the lean burn zone, the ionic current is measured at each ignition in each cylinder, and the lean limit is detected in accordance with the combustion time period NIONAF determined by means of ionic current. In this case, the control proceeds to step 51→52→53, so that the smoothed value NAFAVn of the current combustion time period is subtracted from the current combustion time period NIONAFn, thereby to determine whether or not the air-fuel ratio has reached the lean limit. In other words, as shown in FIG. 4, under the condition of unstable combustion the ionic current changes without such appreciable peaks as under the condition of normal combustion, so that the combustion time period NIONAF under the condition of unstable combustion becomes longer than under the condition of normal combustion. When the lean limit has been detected, the control proceeds to step 61 so as to correct the amount of fuel to be injected. If it is the first cylinder in which the air-fuel ratio is found to be at the upper limit of the lean burn zone, the control proceeds to step 61→62→63→65, so that the amount of fuel to be injected is corrected to increase in the first cylinder. Later on, if the air-fuel ratio in the first cylinder is found to be lower than the upper limit of the lean burn zone, the control proceeds to step 61→62→64→65, so that the amount of fuel to be injected is corrected to decrease, and the air-fuel ratio changes from the rich to the lean side.

Thus, the lean limit can be detected at each and every ignition, and the amount of fuel to be injected can be corrected in each cylinder of the engine in accordance with the detected lean limit, thereby making it possible to deal with any change in the driving condition or with any type of engine. Therefore, it becomes possible to continue driving an engine with an air-fuel ratio adjusted sufficiently close to the upper limit of the lean burn zone even though the limit is fluctuating. This contributes to improvement of fuel consumption. In addition to that, torque fluctuation is prevented with resulting improvement of drivability and emissions.

This invention is not limited to the above described embodiments. For example, it may be embodied in an engine having a plurality of cylinders controlled with simultaneous fuel injection.

In the above-mentioned embodiments the lean limit is detected on the basis of the time period for which the ionic current MADCx is above a predetermined reference level PIONAF, or the time period from ignition to the final point when the ionic current MADCx is above the above-mentioned predetermined level PIONAF. In addition to the above-mentioned methods, by detecting the dispersion of peak values of the ionic current MADCx the lean limit can also be detected on the basis of the above-mentioned time period and the greatest peak value of the ionic current MADCx. The dispersion of peak values of the ionic current MADCx can be replaced by the dispersion of the integral values of the time period from ignition to the final point when the ionic current MADCx is above the predetermined reference level PIONAF.

The arrangement of each component part of the invention is not limited to the above-mentioned embodiments, but there may be various modifications without departing from the spirit or essential characteristics thereof.

In accordance with the invention, since the lean limit is detected on the basis of one or more of the characteristics of the ionic current, such as the time period for which the ionic current is above a predetermined reference level, the dispersion of peak values of the ionic current, the dispersion of the integral values of the ionic current, it is easy to control the air-fuel ratio in the lean burn zone.

What is claimed is:

1. A method for detecting a lean limit in an internal combustion engine by means of ionic current, comprising the steps of;

measuring a characteristic of an ionic current flowing in a cylinder of said engine immediately after ignition, and detecting the lean limit based upon said characteristic of said ionic current.

2. The method as defined in claim 1, wherein said characteristic of said ionic current is the total of the time periods for each of which said ionic current is above a predetermined reference level.

3. The method as defined in claim 1, wherein said characteristic of said ionic current is the time period from ignition to a final point when said ionic current is above said predetermined reference level.

4. The method as defined in claim 1, wherein said characteristic of said ionic current is the dispersion of peak values of said ionic current.

5. The method as defined in claim 1, wherein said characteristic of said ionic current is the dispersion of products of said ionic current values multiplied by the combustion time period.

6. The method as defined in claim 1, wherein said characteristic of said ionic current is the dispersion of products of said ionic current values measured at predetermined intervals multiplied by a coefficient determined in accordance with the nominal cylinder volume.

7. A method for detecting a lean limit in an internal combustion engine by means of ionic current, comprising the steps of;

measuring a characteristic of an ionic current flowing in a cylinder of said engine immediately after ignition, comparing said characteristic of said ionic current with a predetermined reference characteristic, and detecting the lean limit based upon the result of said comparison, when said characteristic of said ionic current deviates from said predetermined reference characteristic.

8. The method as defined in claim 7, wherein said characteristic of said ionic current is the total of time periods for each of which said ionic current is above a predetermined reference current level.

9. The method as defined in claim 7, wherein said characteristic of said ionic current is the time period from ignition to a final point when said ionic current is above said predetermined reference level.

10. A method for detecting a lean limit in an internal combustion engine by means of ionic current, comprising the steps of;

measuring characteristic values of an ionic current flowing in a cylinder of said engine after ignition and from a predetermined point prior to the top dead center, calculating a mean value of said characteristic values of said ionic current, a variance thereof, or a quotient-of said variance divided by said mean value, and detecting the lean limit based upon said calculated value.

11. The method as defined in claim 10, wherein said characteristic value of said ionic current is a peak value of said ionic current.

12. The method as defined in claim 10, wherein said characteristic value of said ionic current is the product of said peak value multiplied by the combustion time period.

13. The method as defined in claim 10, wherein said characteristic value of said ionic current is the total of a plurality of products each of which is obtained by multiplying one of the values of said ionic current measured at predetermined intervals by a predetermined coefficient.

14. The method defined in claim 13, wherein said predetermined coefficient is an effective work coefficient which varies with the nominal cylinder volume.

* * * * *